United States Patent [19]
Renggli et al.

[11] Patent Number: 5,779,152
[45] Date of Patent: Jul. 14, 1998

[54] COORDINATED VECTORING EXHAUST NOZZLE WITH SCISSORS LINKAGE

[75] Inventors: Bernard J. Renggli; Robert J. Ellerhorst, both of Cincinnati, Ohio

[73] Assignee: General Electric Company, Cincinnati, Ohio

[21] Appl. No.: 783,854

[22] Filed: Jan. 16, 1997

[51] Int. Cl.$^6$ .............................. B64C 15/02; F02K 1/12
[52] U.S. Cl. ........................... 239/265.33; 239/265.39; 60/232
[58] Field of Search ................ 239/265.33, 265.35, 239/265.37, 265.39; 60/228, 230, 232, 271

[56] References Cited

U.S. PATENT DOCUMENTS

| | | | |
|---|---|---|---|
| 232,158 | 8/1880 | Barcza | 60/232 |
| 2,932,163 | 6/1960 | Hyde | 60/265.37 |
| 3,786,992 | 1/1974 | Robinson | 239/265.39 |
| 4,128,208 | 12/1978 | Ryan et al. | 239/265.39 |
| 4,994,660 | 2/1991 | Hauer | 239/265.41 |
| 5,261,605 | 11/1993 | McLafferty et al. | 239/265.35 |
| 5,261,606 | 11/1993 | Barcza | 60/232 |
| 5,285,637 | 2/1994 | Barcza | 60/232 |
| 5,437,411 | 8/1995 | Renggli | 239/263.39 |

OTHER PUBLICATIONS

Goplan et al, "Integrated Approach to the F414 Afterburner," GE—*The Leading Edge*, Winter 1994, pp: cover, 3, 12–15, and back.

General Electric Company, "Partial Developed View R–R," F414 secondary seal support in CD exhaust nozzle (unpublished), single page.

*Primary Examiner*—Timothy Thorpe
*Assistant Examiner*—Ted Kim
*Attorney, Agent, or Firm*—Andrew C. Hess; Patrick R. Scanlon

[57] ABSTRACT

An exhaust nozzle includes a plurality of circumferentially spaced apart exhaust flaps, and a plurality of scissor linkages joined to respective ones thereof. Each linkage includes a frame pivotally joined to a respective one of the flaps. A carriage is slidably mounted to the frame. A pair of circumferentially oppositely extending side links are pivotally joined at one end to the carriage, and pivotally joined at opposite ends to corresponding side links to form an interconnected ring thereof. A pair of circumferentially oppositely extending equalizer links are pivotally joined at one end to the frame, and pivotally joined at opposite ends to corresponding ones of the side links to maintain coordinated angular position of the side links pivotable on the carriage, and in turn maintain circumferential spacing between adjacent ones of the flaps.

10 Claims, 4 Drawing Sheets

COORDINATED VECTORING EXHAUST NOZZLE WITH SCISSORS LINKAGE

BACKGROUND OF THE INVENTION

The present invention relates generally to aircraft gas turbine engines, and, more specifically, to a variable area, vectoring exhaust nozzle for an augmented turbofan gas turbine engine.

In an augmented turbofan gas turbine engine, an afterburner or augmenter is disposed downstream of a core engine and receives core gases therefrom. At the aft end of the augmenter is a variable area exhaust nozzle for discharging the exhaust gases. The exhaust nozzle typically includes a plurality of circumferentially adjoining primary exhaust flaps and a plurality of circumferentially adjoining secondary exhaust flaps extending downstream therefrom, with a corresponding plurality of connecting compression links, or outer flaps, joining the secondary flaps to an exhaust casing for defining four bar linkages which control kinematic motion of the primary and secondary flaps. The primary flaps define a converging flowpath joining the secondary flaps at a throat of minimum flow area, with the secondary flaps diverging to a nozzle outlet to define a variable area converging-diverging (CD) nozzle. During dry, unfueled operation of the augmenter, the exhaust nozzle is positioned in a minimum closed position for discharging the exhaust gases from the core engine. During wet, fueled operation, additional fuel is injected into the augmenter and mixed with the core gases and bypass fan air, and ignited for generating additional thrust. The exhaust nozzle, therefore, is positioned in its maximum open position for efficiently discharging the exhaust gases with increased thrust. In order to improve maneuvering performance of a military aircraft powered by an augmented gas turbine engine, it is desirable to vector the exhaust gases from the exhaust nozzle for providing a side component of thrust. A typical non-vectoring exhaust nozzle is axisymmetric about an axial or longitudinal centerline axis, with the primary and secondary flaps being circumferentially spaced apart from each other in a circular arrangement. The circumferential spaces between the primary and secondary flaps vary during opening and closing of the exhaust nozzle and are typically sealed by respective pluralities of primary and secondary seals which are suitably mounted therein. Accordingly, the circumferentially overlapping flaps and inter-flap seals provide an assembly of components whose motion must be suitably coordinated for confining the hot exhaust flow without unacceptable leakage. In an axisymmetric, variable area exhaust nozzle, this is readily accomplished since respective pairs of primary and secondary flaps are joined together in four-bar linkages with radially pivoting joints having circumferential restraint. In order to provide vectoring capability, the secondary flaps require an additional degree of movement or pivoting in the circumferential direction which increases the difficulty of maintaining coordinated movement of the secondary flaps and inter-flap seals. U.S. Pat. No. 4,994,660-Hauer, assigned to the present assignee, discloses one type of axisymmetric vectoring CD exhaust nozzle having primary and secondary exhaust flaps and inter-flap seals.

In this patent, the secondary exhaust flaps are pivotally joined to the primary exhaust flaps using universal joints which allow both radial pivoting of the secondary flaps as well as limited circumferential pivoting. The compression links or arms are mounted at forward ends to an actuation ring which may be translated and tilted to deflect the secondary flaps to vector exhaust flow. In order to obtain statically determinate kinematic motion of the flaps, the compression links are in the form of A-frames pivotally mounted at forward ends to the actuation ring at a pair of circumferentially spaced apart pivoting joints, and pivotally mounted at an opposite end thereof to a corresponding secondary flap at a single pivoting joint. The circumferential restraint of the A-frames maintains structural rigidity of the exhaust nozzle throughout its operating range.

However, the vectoring angle of this exhaust nozzle is limited during operation as the secondary flaps or seals bump together on one side of the nozzle, or the flaps and seals separate and unfeather on the opposite side of the nozzle during vectoring.

In order to solve these bumping and unfeathering limits, an improved vectoring CD exhaust nozzle is disclosed in U.S. Pat. No. 5,437,411 -Renggli, assigned to the present assignee. In this design, the A-frame compression inks are replaced by simple elongate links pivotally mounted at opposite ends for two degrees of rotation both radially and circumferentially. A positioning apparatus, including a plurality of centering levers, is then required for joining together circumferentially adjacent flaps and inter-flap seals for maintaining alignment therebetween during variable area and vectoring operation of the exhaust nozzle. However, this design is subject to binding of the articulated components thereof, which is undesirable for obtaining unrestrained operation over a suitable operating range.

Accordingly, an improved axisymmetric vectoring CD exhaust nozzle is desired for eliminating undesirable bumping and unfeathering limits over a suitable operating range, with free, unrestrained movement of the components over the operating range.

SUMMARY OF THE INVENTION

An exhaust nozzle includes a plurality of circumferentially spaced apart flaps, and a plurality of scissor linkages joined to respective ones thereof. Each linkage includes a frame pivotally joined to a respective one of the flaps. A carriage is slidably mounted to the frame. A pair of circumferentially oppositely extending side links are pivotally joined at one end to the carriage, and pivotally joined at opposite ends to corresponding side links to form an interconnected ring thereof. A pair of circumferentially oppositely extending equalizer links are pivotally joined at one end to the frame, and pivotally joined at opposite ends to corresponding ones of the side links to maintain coordinated angular position of the side links pivotable on the carriage, and in turn maintain circumferential spacing between adjacent ones of the flaps.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
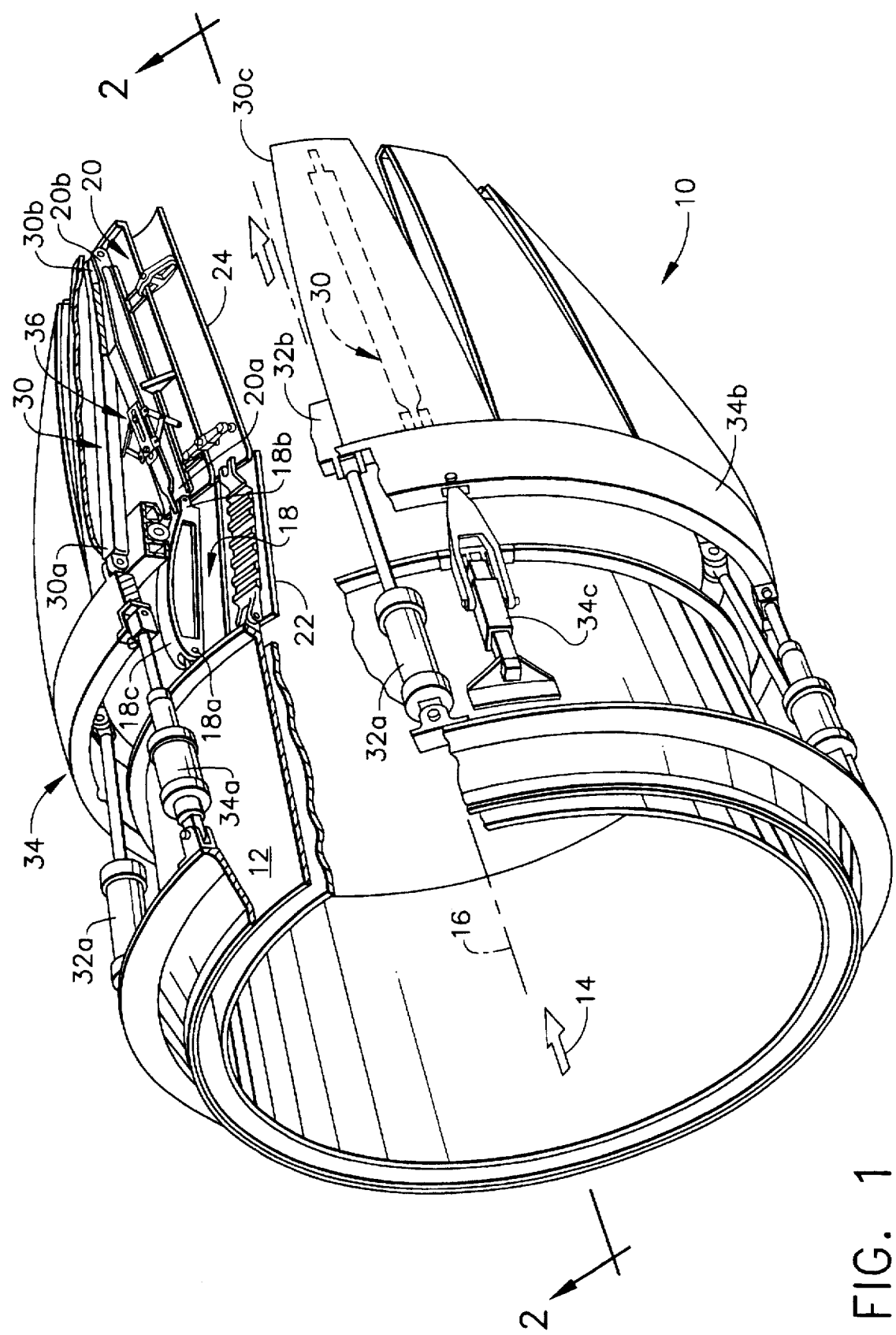
FIG. 1 is a partly sectional, isometric view of a portion of an axisymmetric, variable area CD exhaust nozzle in accordance with an exemplary embodiment of the present invention for use with an aircraft gas turbine engine.

Illustrated in FIG. 1 is a variable area exhaust nozzle 10 in accordance with an exemplary embodiment of the present invention for use in an aircraft gas turbine engine (not shown). The nozzle 10 includes an annular casing 1 2 which is suitably fixedly attached to an afterburner or augmenter (not shown) of the gas turbine engine for receiving core gases or exhaust flow 14 therefrom. The nozzle 10 is axisymmetric about an axial or longitudinal centerline axis 16 and has a generally circular flowpath for channeling the exhaust flow 14 therethrough.

Figure 2:
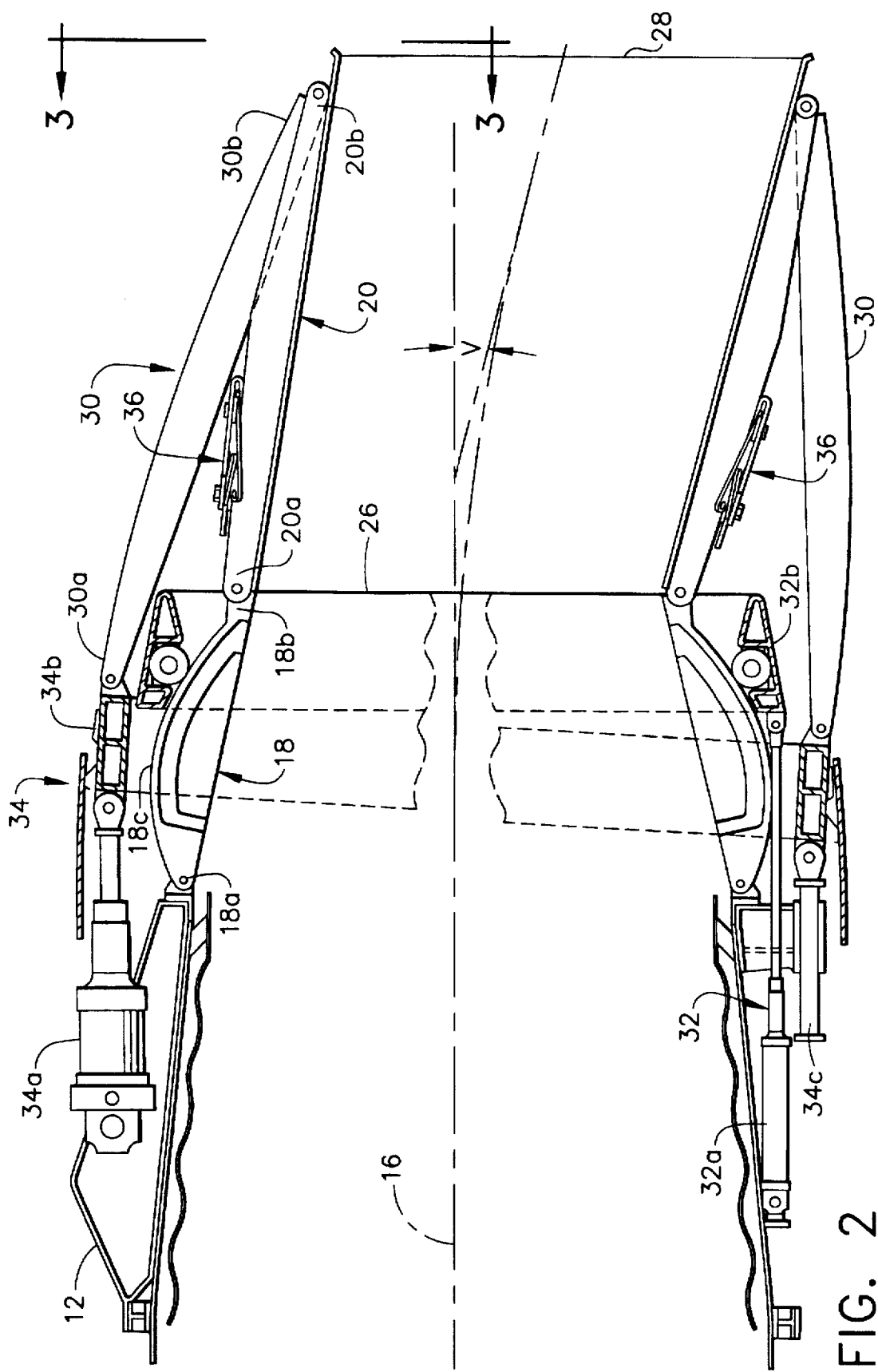
FIG. 2 is an axial sectional view through the exhaust nozzle illustrated in FIG. 1 taken generally along line 2—2, and showing adjustable primary and secondary exhaust flaps in an exemplary vectored position.

As shown in FIGS. 1 and 2, the nozzle 10 further includes a plurality of circumferentially spaced apart primary or convergent exhaust flaps 18 which may take any suitable form. Each primary flap 18 includes forward and aft ends 18a,b, with the forward ends 18a being suitably pivotally joined to the casing 12 for radial pivoting movement relative thereto.

A plurality of circumferentially spaced apart secondary or divergent exhaust flaps 20 have forward and aft ends 20a,b, with the forward ends being suitably pivotally joined to corresponding ones of the primary flap aft ends 18b. These pivotal joints are preferably universal U-joints for allowing two dimensional rotation of the secondary flaps 20 both radially and circumferentially relative to the primary flaps 18 from which they extend in a downstream direction.

Suitably mounted between adjacent ones of the primary flaps 18 are corresponding primary seals 22 as shown in FIG. 1. And suitably mounted between adjacent ones of the secondary flaps 20 are respective secondary seals 24. The primary and secondary seals 22, 24 circumferentially overlap the inboard surfaces of the corresponding primary and secondary flaps 18, 20 and are pressure loaded during operation for maintaining effective sealing therewith. As shown in FIG. 2, the juncture between the primary and secondary flaps 18, 20 defines a throat 26 of minimum flow area designated $A_8$. The aft end of the secondary flaps 20 define an annular nozzle outlet 28 having an outlet flow area designated $A_9$. The primary flaps 18 generally define an annular converging portion of the nozzle, with the secondary flaps 20 generally defining a diverging portion of the nozzle for effecting a converging-diverging (CD) variable area nozzle.

In order to vary the area of the outlet 28 in conjunction with the throat 26 during operation, a plurality of circumferentially spaced apart outer flaps 30, as illustrated in FIGS. 1 and 2, are provided. Each outer flap 30, also referred to as a compression link, has a forward end 30a suitably mediately joined to the casing 12 as described in more detail hereinbelow, and an aft end 30b pivotally joined to a corresponding one of the secondary flap aft ends 20b to effect respective four-bar linkages to define or control kinematic motion of the primary and secondary flaps 18, 20. A separate or integral fairing 30c is disposed atop each compression link 30 for providing an aerodynamically smooth outer surface thereof.

Suitable means 32 are provided for pivoting the primary flaps 18 to vary convergence thereof, and in turn to vary divergence of the secondary flaps 20, and in turn vary flow areas $A_8$ and $A_9$ therethrough. In the exemplary embodiment illustrated in FIGS. 1 and 2, the pivoting means 32 include a plurality of conventional linear actuators 32a which have extendable output rods suitably joined to a first actuation ring 32b positioned circumferentially around the primary flaps 18. Each primary flap 18 further includes a suitable cam 18c forming an axial structural rib on the outboard side thereof having a suitable cam profile.

The first ring 32b includes suitable rollers for following the corresponding cams 18c so that as the first ring 32b is axially translated during operation, the cams 18c maintain contact with and follow the cam rollers. The pressure of the exhaust flow 1 4 during operation ensures that the primary flaps 18 are urged against the first ring 32b, with the axial position of the first ring 32b controlling the angular orientation of the several primary flaps 18c. As the first ring 32b is drawn forward, the primary flaps 18 pivot radially inwardly for decreasing the area of the throat 26, with axial aft translation of the first ring 32b increasing the area of the throat 26.

While maintaining stationary the axial position of the forward ends 30a of the compression links 30, the secondary flaps 20 kinematically follow the motion of the primary flaps 18 as they pivot due to the four-bar linkage arrangement therewith. In this way, divergence of the secondary flaps 20 and the area of the nozzle outlet 28 are also varied as the primary flaps 18 are pivoted during operation to effect a variable area converging-diverging (CD) exhaust nozzle for the exhaust flow 14.

In order to provide vectoring of the exhaust nozzle 10, additional means 34, shown in FIGS. 1 and 2, are provided for translating the compression links 30 to vector the secondary flaps 20 to which they are attached. The translating means 34 include a plurality of circumferentially spaced apart linear actuators 34a having axially extendable output rods suitably joined to a second actuation ring 34b. A plurality of axial guide rods 34c are also preferably used at circumferential positions generally opposite to the corresponding actuators 34a.

By operating the actuators 34a to axially translate and tilt the second actuation ring 34b, the forward ends 30a of the compression links 30 are correspondingly translated which in turn vectors the aft ends 30b of the compression links 30. As shown in FIG. 2, the top compression links 30 are axially translated aft more than the bottom compression links 30 to tilt downwardly the nozzle outlet 28 at a vectoring angle V from the centerline axis 16. The pivoting and translating means 32, 34 therefore allow both variable area operation of the nozzle 10 as well as vectoring thereof in a generally conventional manner using conventional components such as those disclosed in the Hauer and Renggli patents referenced above. The translating means 34 also allow independent variation of the outlet flow area $A_9$ of nozzle 28.

As in the Renggli patent, the compression links 30 illustrated in FIGS. 1 and 2 are preferably simple elongate members pivotally joined at their opposite ends 30a,b to the second actuation ring 34b and the aft ends of the secondary flaps 20, respectively. The pivoting joints preferably have two or three degrees of rotation for allowing both radial pivoting as well as limited circumferential pivoting, which therefore renders statically indeterminate the kinematic motion of the secondary flaps 20, which also enjoy circumferential pivoting movement relative to the primary flaps 18 to which they are attached using the universal joints. In the Renggli patent, the secondary flaps and seals are interconnected using one type of lever arrangement having the binding problems discussed above.

In accordance with the present invention, either the secondary flaps 20 or the outer flaps 30 may be interconnected to enjoy improved coordinated movement therebetween for allowing maximum vectoring of the nozzle 10 without bumping or unfeathering of the secondary flaps and seals, and without binding of the coordinating linkages.

Figure 3:
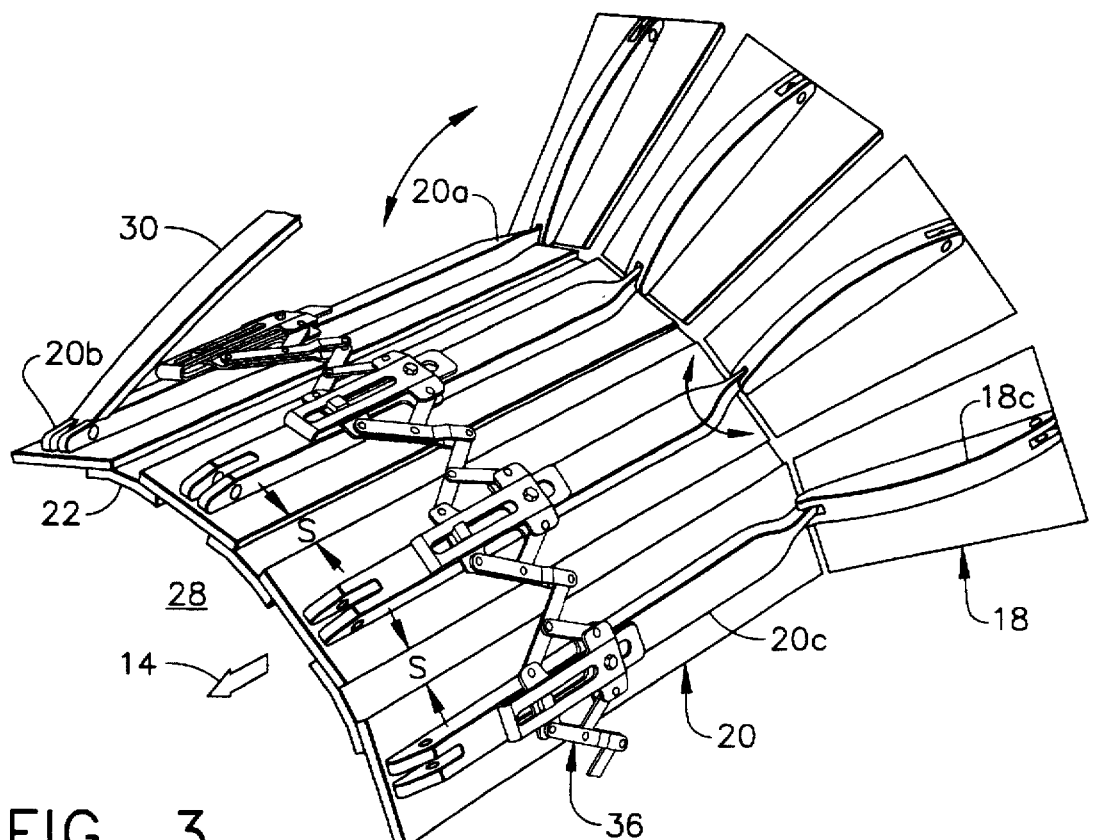
FIG. 3 is an aft-facing-forward isometric view of a portion of the exhaust nozzle illustrated in FIG. 2 and taken generally along line 3—3 showing interconnected scissor linkages mounted to the secondary exhaust flaps of the exhaust nozzle for coordinating motion thereof in an un-vectored position.
Figure 4:
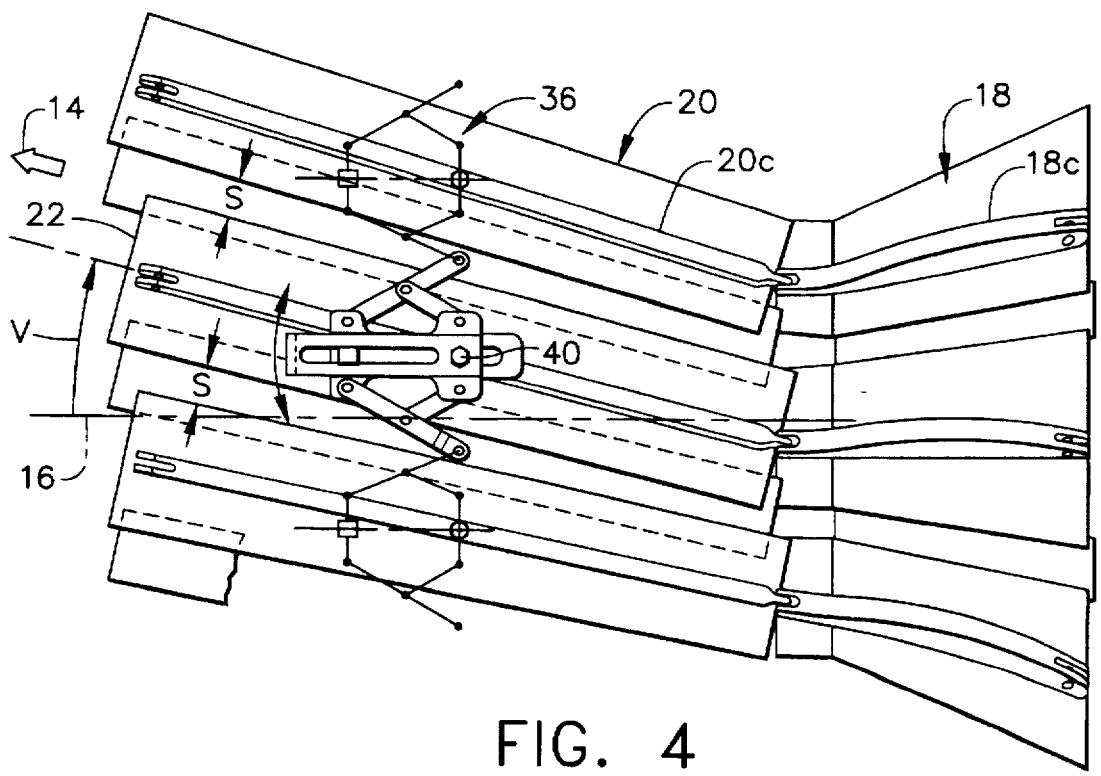
FIG. 4 is a top view of the exhaust nozzle illustrated in FIG. 3 in a vectored position, with the scissor linkages maintaining circumferential spacing between the adjacent secondary flaps.

More specifically, a plurality of scissor linkages 36 are provided in accordance with the present invention to coordinate the circumferential motion of the secondary flaps 20, and in turn the secondary seals 24 conventionally attached thereto. FIG. 3 illustrates a portion of the exhaust nozzle 10 in un-vectored orientation for axisymmetrically discharging the exhaust flow 14 through the outlet 28 thereof. Each of the scissor linkages 36 is pivotally mounted to a respective one of the secondary flaps 20 on their outboard sides in this exemplary embodiment. FIG. 4 illustrates the secondary flaps 20 being vectored to an exemplary vectoring angle V for discharging the exhaust flow 14 obliquely to the centerline axis 16.

Figure 5:
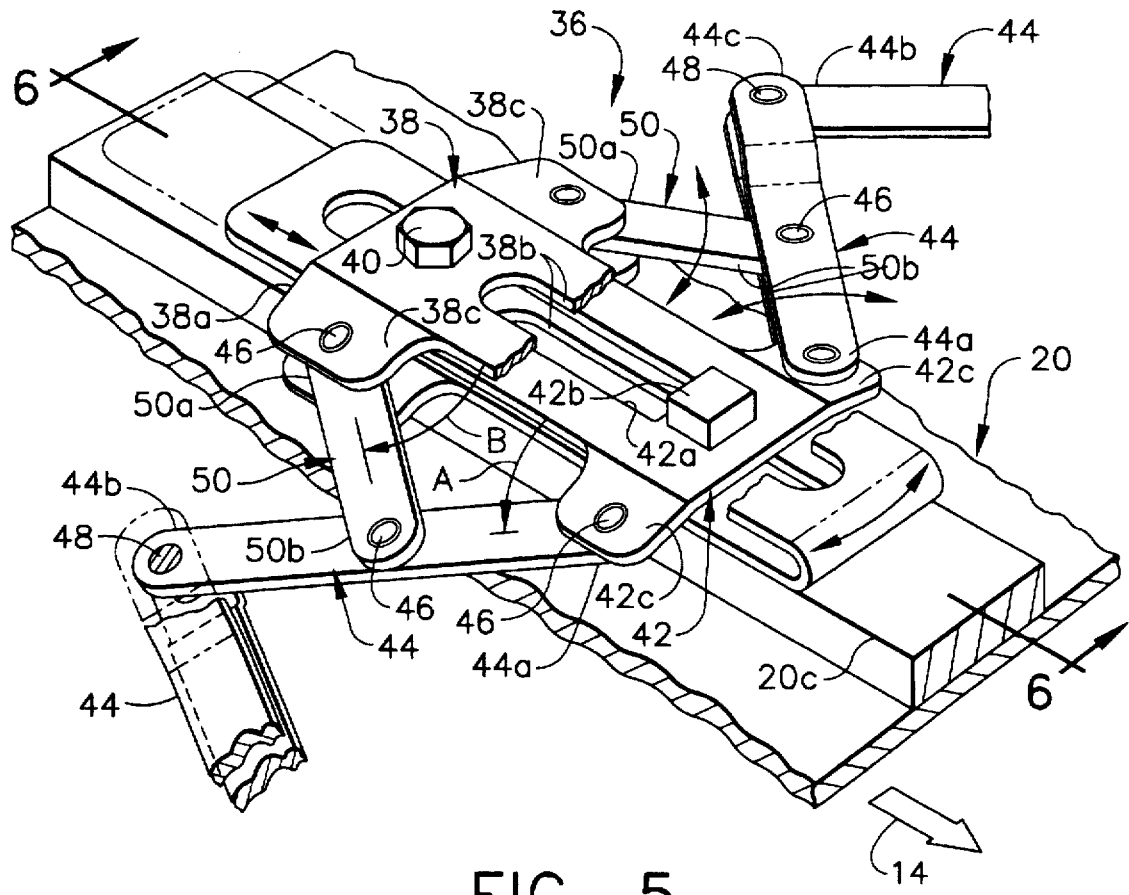
FIG. 5 is an enlarged, partly sectional view of an exemplary one of the scissor linkages illustrated in FIG. 3 mounted to a respective secondary exhaust flap.
Figure 6:
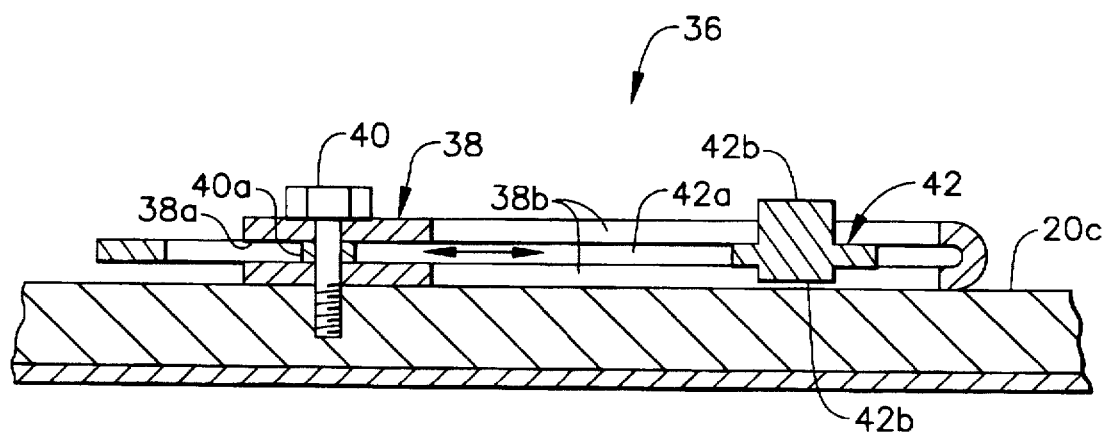
FIG. 6 is an axial sectional view through the scissor linkage illustrated in FIG. 5 and taken along line 6—6.

FIGS. 5 and 6 illustrate in more particularity an exemplary one of the identical scissor linkages 36 disposed on corresponding ones of the secondary flaps 20. More specifically, each scissor linkage 36 includes a frame 38 pivotally joined at a single end thereof to a respective one of the secondary flaps 20 using a suitable fastener 40, such as a pin or fastening bolt for example. Each secondary flap 20 preferably includes a structural rib 20c integrally formed on its outboard side to which the fastener 40 may be threadingly fastened for retaining the scissor linkage 36 thereto. By mounting the frame 38 at only one point to the secondary flap 20, it is allowed to freely rotate thereabout as shown by the double headed arrows in FIGS. 4 and 5 to accommodate without restraint vectoring of the secondary flaps 20.

Referring again to FIGS. 5 and 6, each scissor linkage 36 also includes a carriage 42 suitably slidably mounted to the frame 38 for longitudinal or axial translation relative thereto. A pair of circumferentially oppositely extending wing or side links 44 are each pivotally joined at a first end 44a to the carriage 42, and pivotally joined at an opposite second end 44b,c to a corresponding side link 44 of a circumferentially adjacent scissor linkage 36. For example, the side link first ends 44a may be suitably joined to the carriage 42 using simple pins 46 for allowing pivoting movement of the side links 44 thereabout. In the exemplary embodiment illustrated in FIG. 5, the second end 44b of one side link 44 is a simple flat plate in configuration, whereas the second end 44c of the second side link 44 is in the form of a U-shaped clevis. The second end 44b of one side link 44 is suitably pivotally joined inside the second end 44c of an adjacent side link 44 using a conventional spherical bearing or joint 48. The first and second side links 44 may be one or twopiece metal components as desired for effecting the kinematic motion.

In this way, the oppositely extending side links 44 of each scissor linkage 36 are pivotally interconnected with adjoining side links 44 of the adjacent scissor linkages 36 to form an interconnected ring of the side links 44 and carriages 42 which is axisymmetrical about the centerline axis 16 of the nozzle. In this configuration, the interconnected side links 44 can spread or fold without restraint or binding and enjoy unrestrained circumferential expansion and contraction of the interconnected ring as the secondary flaps 220 are radially positioned to increase or decrease the area of the outlet 28.

However, in order to prevent unrestrained circumferential movement between adjacent ones of the secondary flaps 20, a pair of circumferentially oppositely extending equalizer links 50 are disposed between the frame 38 and corresponding ones of the side links 44 to equalize their angular movement. Each equalizer link 50 is suitably pivotally joined at a first end 50a to one side of the frame 38 using one of the pins 46, for example. An opposite, second end 50b of each link 50 is suitably pivotally joined to a corresponding one of the side links 44, at an intermediate portion thereof for example, using an additional one of the pins 46. Since the frame 38 is axially attached to the secondary flap 20, it provides a common reference point for pivoting movement of the attached side links 44. In order to allow the side links 44 to pivot relative to the carriage 42, the carriage 42 must axially slide relative to the frame 38 as shown by the double headed arrow in FIG. 5.

The side and equalizer links 44, 50 are symmetrically mounted on opposite circumferential sides of the carriage 42 and frame 38 at preferably equal inclination angles A and B, respectively. The inclination angles A for the two side links 44 are acute angles equal to each other. And, the inclination angles B for the two equalizer links 50 are also acute angles equal to each other, which may or may not be equal to the angles A. The angles A, B may have any suitable values which both increase as the secondary flaps 20 are pivoted radially outwardly to increase the area of the nozzle outlet 28. As the secondary flaps 20 open the nozzle outlet 28, the circumference around the secondary flaps 20 increases, and the side links 44 correspondingly spread apart in each linkage 36 like wings to accommodate the increased circumference. Simultaneously, the equalizer links 50 spread apart as the carriage 42 slides forwardly.

Since the equalizer links 50 are joined to common frames 38, they coordinate and maintain equal the angular positions of the attached side links 44 pivoting on the carriage 42, and in turn maintain substantially equal circumferential spacing S as illustrated in FIG. 3 between adjacent ones of the secondary flaps 20 during both non-vectoring, variable area operation as well as during vectoring, variable area operation.

As shown in FIG. 4, in order to allow unrestrained vectoring operation of the secondary flaps, the scissor linkages 36 must be allowed to pivot on the secondary flaps 20. In one embodiment illustrated in more particularity in FIGS. 5 and 6, the frame 38 is pivotally mounted at its forward end to the secondary flap 20 using the single fastener 40. And, the cooperating carriage 42 is suitably mounted to the frame 38 for concurrent pivoting movement therewith on the flap 20.

In the specific embodiment illustrated in FIG. 5, the frame 38 is pivotally joined to the secondary flap 20 adjacent the first ends 50a of the equalizer links 50, and the second ends 50b thereof are disposed aft of the first ends 50a thereof. Correspondingly, the first ends 44a of the side links are disposed aft of the second ends 50b of the equalizer links 50, and the second ends 44b,c of the side links 44 are disposed forward of the second ends 50b of the equalizer links 50. The equalizer links 50 are therefore pivotally joined to corresponding ones of the side links 44 intermediate the two opposite ends thereof.

In this configuration, the side links 44 and equalizer links 50 are inclined in the circumferential direction at the acute inclination angles A, B relative to the longitudinal axis of the carriage 42 and frame 38, respectively. The inclination angles A, B vary over a suitable range as the side links 44 spread apart or fold together to accommodate opening and closing of the secondary flaps 20. And, the length and relative pivoting positions of the side and equalizer links 44,50 are also selected for obtaining the desired kinematic motion of the scissor linkages 36.

As the side links 44 pivot during variable area operation, the carriage 42 slides axially or longitudinally relative to the frame 38, with the equalizer links 50 ensuring symmetric and equal pivoting of the side link pair of each scissor linkage 36. In turn, substantially equal circumferential spacing S as illustrated in FIGS. 3 and 4 is maintained between the adjacent secondary flaps 20. As shown in FIG. 3, lateral or circumferential position of the secondary flaps 20 is therefore controlled by the three-point mounting thereof, i.e., at the forward and aft ends 20a,b thereof; and at the intermediate location therebetween at which the scissor linkage 36 is mounted.

The pivot joint provided at the forward and aft ends of the secondary flaps 20 allow both variable area and vectoring operation, with the scissor linkages 36 coordinating the circumferential spacing between the secondary flaps 20 in both variable area and vectoring operation. The scissor linkages 36 provide unlimited vectoring operation within the kinematic capability of the nozzle 10 itself, and without undesirable bumping or unfeathering of the secondary flaps 20 and cooperating secondary seals 22. And, the scissor linkages 36 operate without binding or interference over the entire operating range of the nozzle.

FIGS. 5 and 6 illustrate an exemplary configuration of the frame 38 and carriage 42 which allows relative longitudinal movement therebetween as the side links 44 and equalizer links 50 pivot during operation. In this embodiment, the frame 38 is generally U-shaped and is pivotally joined atop respective ones of the secondary flaps 20 at a forward facing, open end 38a thereof. The fastener 40 extends through the frame 38 and may be suitably secured in the rib 20c.

Correspondingly, the carriage 42 is in the form of a flat plate suitably slidably trapped inside the frame 38 for axial reciprocating movement therein. In the exemplary embodiment illustrated in FIGS. 5 and 6, this may be accomplished by providing a center, longitudinal slot 42a in the carriage 42 through which the fastener 40 extends. The fastener 40 may include a suitable bushing 40a, as shown in FIG. 6, for reducing clearance therebetween and ensuring smooth relative sliding motion therebetween.

Correspondingly, the frame 38 includes a pair of identical longitudinal slots 38b centered in both of its halves, with the carriage 42 including a pair of bosses 42b sized to slide within the corresponding frame slots 38b. In this arrangement, the carriage 42 is constrained to slide solely axially or longitudinally relative to the frame 38 as the side links 44 pivot to spread or fold their angular extent during variable area operation. And, during vectoring operation, the secondary flaps 20 are skewed circumferentially, with the cooperating frame 38 and carriage 42 pivoting together about the fastener 40 to prevent restraint thereof.

Since the scissor linkages 36 extend circumferentially about corresponding ones of the secondary flaps 20, it is preferred that they are configured to conform with the annular orientation thereof for free pivoting movement. As shown in FIG. 5, the frame 38 preferably includes pairs of integral tabs 38c extending from opposite circumferential sides thereof to define clevises, and the first ends 50a of the respective equalizer links 50 are pivotally joined to the respective devises thereof using the pins 46, for example.

Correspondingly, the carriage 42 includes a pair of integral tabs 42c extending from opposite circumferential sides thereof, and the first ends 44a of the respective side links 44 are suitably pivotally joined to respective ones thereof also using the pins 46, for example. As shown in FIG. 5, the tabs 38c and 42c are preferably inclined radially inwardly to conform with the annular curvature around the adjoining secondary flaps 20. The scissor linkages 36 are preferably identical to each other.

Other configurations of the scissor linkages 36 may be used which permit relative longitudinal movement between the carriage 42 and the frame 38 for allowing the side links 44 and equalizer links 50 attached thereto to pivot without restraint during operation. And, the scissor linkages 36 may be attached either to respective ones of the secondary flaps 20 as illustrated in FIG. 3, for example, or instead may be similarly attached to respective ones of the outer flaps 30 for indirectly controlling and coordinating circumferential position of the secondary flaps 20. Since the outer flaps 30 are joined at their aft ends to the aft ends of the secondary flaps 20, coordination of the circumferential movement of the outer flaps 30 also similarly coordinates circumferential movement of the secondary flaps 20 joined thereto. In both embodiments, the circumferential spacing S between the secondary flaps 20 is coordinated during both variable area and vectoring operation of the nozzle.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine exhaust nozzle comprising: a plurality of circumferentially spaced apart flaps; and a plurality of scissor linkages, each including:

a frame pivotally joined to a respective one of said flaps;

a carriage slidably mounted to said frame;

a pair of circumferentially oppositely extending side links each pivotally joined at a first end to said carriage, and pivotally joined at an opposite second end to a corresponding side link of a circumferentially adjacent scissor linkage to form an interconnected ring of said side links allowing circumferential spreading and folding thereof; and a pair of circumferentially oppositely extending equalizer links, each pivotally joined at a first end to said frame, and pivotally joined at an opposite second end to a corresponding one of said side links to coordinate angular position of said side links pivotable on said carriage, and in turn maintaining circumferential spacing between adjacent ones of said flaps.

2. A nozzle according to claim 1 wherein said carriage is mounted to said frame for concurrent pivoting movement therewith on said flap.

3. A nozzle according to claim 2 wherein said side and equalizer link pairs are symmetrically mounted on opposite sides of said carriage and frame.

4. A nozzle according to claim 3 wherein said equalizer links are pivotally joined to corresponding ones of said side links intermediate said opposite ends thereof.

5. A nozzle according to claim 4 further comprising:

an annular casing;

a plurality of circumferentially spaced apart primary exhaust flaps having forward and aft ends, with said forward ends thereof being pivotally joined to said casing;

a plurality of circumferentially spaced apart secondary exhaust flaps having forward and aft ends, with said forward ends thereof being pivotally joined to corresponding ones of said primary flap aft ends;

a plurality of circumferentially spaced apart outer flaps having forward and aft ends, with said forward ends thereof mediately joined to said casing, and said aft ends thereof pivotally joined to corresponding ones of said secondary flap aft ends to effect respective four-bar linkages to define kinematic motion of said primary and secondary flaps;

said scissor linkages being pivotally mounted to respective ones of said secondary flaps;

means for pivoting said primary flaps to vary convergence thereof, divergence of said secondary flaps, and flow area therethrough;

means for translating said outer flaps to vector said secondary flaps; and wherein said scissor linkages maintain substantially equal circumferential spacing between said secondary flaps during area change and vectoring.

6. A nozzle according to claim 5 wherein said frames are pivotally joined to said secondary flaps adjacent said first ends of said equalizer links, and said second ends thereof are disposed aft of said first end thereof.

7. A nozzle according to claim 6 wherein said first ends of said side links are disposed aft of said second ends of said equalizer links, and said second ends of said side links are disposed forward of said second ends of said equalizer links.

8. A nozzle according to claim 7 wherein said side links and equalizer links are inclined at acute angles A, B relative to said carriage and frame, respectively.

9. A nozzle according to claim 8 wherein:

said frame is generally U-shaped and is pivotally joined atop respective ones of said secondary flaps at an open end thereof; and said carriage is slidably trapped inside said frame for axial reciprocating movement therein.

10. A nozzle according to claim 9 wherein:

said frame includes a pair of integral tabs extending from opposite circumferential sides thereof, and said first ends of said equalizer links are pivotally joined to respective ones thereof; and said carriage includes a pair of integral tabs extending from opposite circumferential sides thereof, and said first ends of said side links are pivotally joined to respective ones thereof.

* * * * *